United States Patent
Tanizawa

(10) Patent No.: US 7,834,307 B2
(45) Date of Patent: Nov. 16, 2010

(54) PULSE WIDTH MODULATION OUTPUT TYPE SENSOR CIRCUIT FOR OUTPUTTING A PULSE HAVING A WIDTH ASSOCIATED WITH A PHYSICAL QUANTITY

(75) Inventor: Yukihiko Tanizawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 382 days.

(21) Appl. No.: 12/010,217

(22) Filed: Jan. 22, 2008

(65) Prior Publication Data

US 2008/0174450 A1 Jul. 24, 2008

(30) Foreign Application Priority Data

Jan. 24, 2007 (JP) ............... 2007-014125

(51) Int. Cl.
*H01L 31/00* (2006.01)
(52) U.S. Cl. ................ 250/214.1; 250/214 R
(58) Field of Classification Search ............ 250/214 R, 250/214.1, 221; 320/132–136, 150–162; 324/426–441; 340/870.2; 315/82, 247, 291, 315/307

See application file for complete search history.

(56) References Cited

U.S. PATENT DOCUMENTS 6,975,095 B2 * 12/2005 Ooi et al. ................. 320/132

2006/0092063 A1 5/2006 Ido et al.

FOREIGN PATENT DOCUMENTS

| JP | A-58-066869 | 4/1983 |
|---|---|---|
| JP | 01-282919 A | 11/1989 |
| JP | A-08-223009 | 8/1996 |
| JP | 11-237290 A | 8/1999 |
| JP | A-11-298327 | 10/1999 |
| JP | 2000-284554 A | 10/2000 |
| JP | A-2002-062341 | 2/2002 |
| JP | 2004-117956 A | 4/2004 |
| JP | A-2004-163389 | 6/2004 |
| JP | A-2006-027294 | 2/2006 |
| JP | 2006-313958 A | 11/2006 |

\* cited by examiner

*Primary Examiner*—Que T Le
(74) *Attorney, Agent, or Firm*—Posz Law Group, PLC

(57) ABSTRACT

A sensor circuit includes an analog-to-digital converter, a control circuit, a calculation circuit, and a pulse width modulation converter. The analog-to-digital converter converts an electric signal associated with a detected physical quantity to sensor data by sampling the electric signal a predetermined sampling number times per a predetermined sampling section. The control circuit determines the sampling number based on a magnitude of the electric signal. The calculation circuit calculates an average value of all the sensor data per the sampling section. The pulse width modulation converter generates a pulse width modulation signal having a pulse width corresponding to the average value.

7 Claims, 4 Drawing Sheets

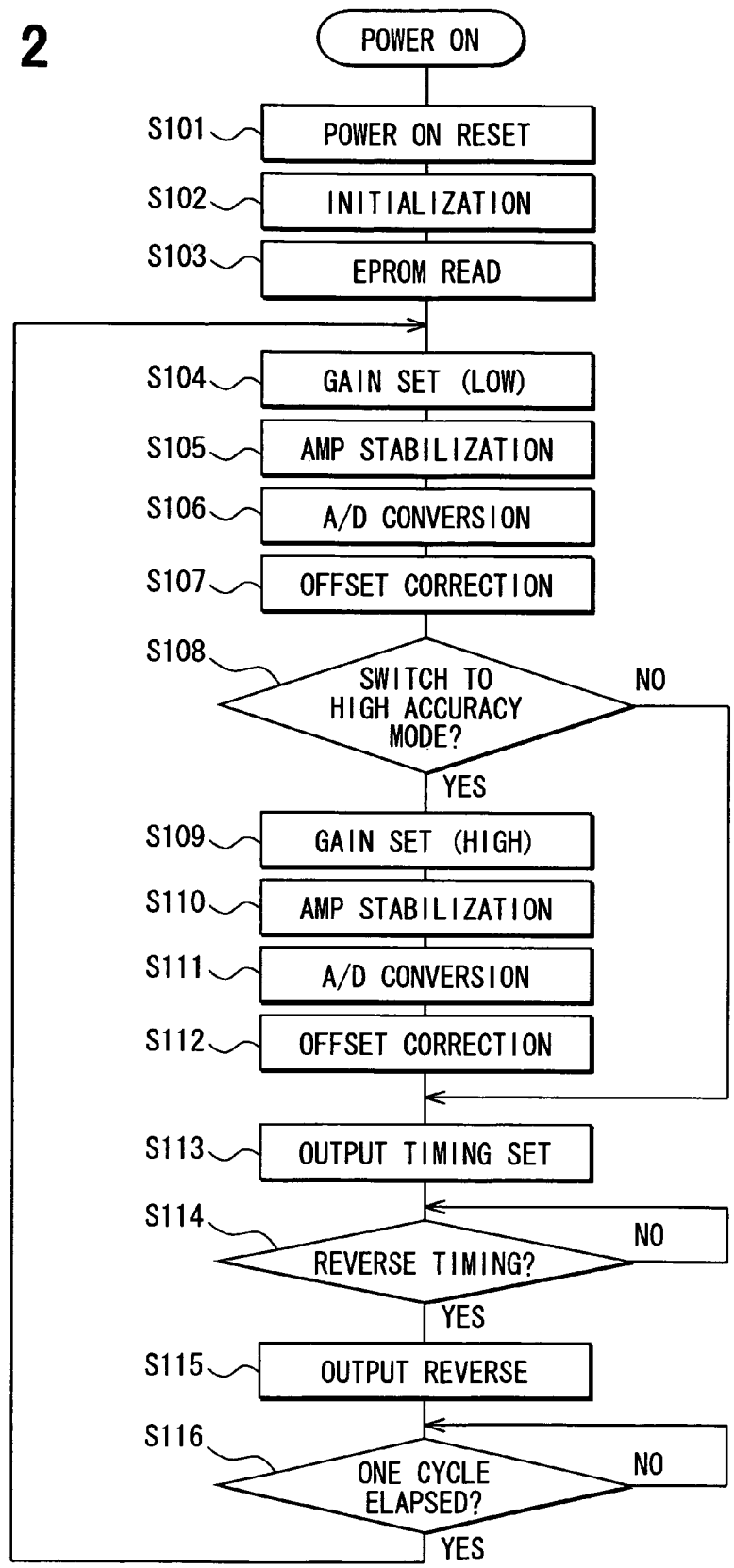

PULSE WIDTH MODULATION OUTPUT TYPE SENSOR CIRCUIT FOR OUTPUTTING A PULSE HAVING A WIDTH ASSOCIATED WITH A PHYSICAL QUANTITY

CROSS REFERENCE TO RELATED APPLICATION

This application is based on and incorporates herein by reference Japanese Patent Application No. 2007-14125 filed on Jan. 24, 2007.

FIELD OF THE INVENTION

The present invention relates to a sensor circuit for generating a pulse width modulation signal having a pulse width associated with a detected physical quantity.

BACKGROUND OF THE INVENTION

A pulse width modulation (PWM) output type pressure sensor disclosed in JP-A-H11-237290 produces a PWM output having a pulse width associated with detected pressure. In the pressure sensor, an analog voltage outputted from a sensing element is converted to a 10-bit digital signal by an analog-to-digital (A/D) converter, and a PWM conversion circuit generates a PWM signal having a duty ratio varying from 2 percents (%) to 95% according to the digital signal. The PWM signal is outputted through an output circuit.

An A/D conversion time of the A/D converter must meet a requirement that a PWM signal having a minimum duty ratio of 2% can be produced within the A/D conversion time. In the pressure sensor, therefore, the number of times the A/D converter samples the analog voltage is fixed to three. However, even when a PWM signal having a duty ratio of 50% or more is produced, the A/D converter samples the analog voltage only three times despite that there is a margin of the A/D conversion time. As a result, the digital data outputted from A/D converter is poor in accuracy, and the pressure sensor may not accurately detect pressure.

The above problem can be overcome by increasing resolution of the digital data and by improving processing speed of the A/D converter and the PWM conversion circuit. However, the increase in resolution result in a reduction in a dynamic range, and such a high-performance A/D converter and PWM conversion circuit are costly.

Further, as shown in FIG. 9 of JP-A-H11-237290, in the pressure sensor, the duty ratio increases lineally with the detected pressure. In short, the resolution of the PWM signal is constant over the entire pressure range. Therefore, although there is often a requirement to change the resolution according to the detected pressure, the pressure sensor cannot satisfy the requirement.

SUMMARY OF THE INVENTION

In view of the above-described problem, it is an object of the present invention to provide a PWM output type sensor that accurately detects a physical quantity over a wide range and have a variable resolution.

According to an aspect of the present invention, a sensor circuit includes a physical quantity obtaining circuit, a sampling number determination circuit, a sampling circuit, a calculation circuit, a pulse width modulation conversion circuit, and an output circuit. The physical quantity obtaining circuit is configured to obtain a physical quantity detected by a sensor element and output a sensor signal indicative of the physical quantity. The sampling number determination circuit is configured to determine a sampling number based on the sensor signal. The sampling circuit is configured to sample the sensor signal the sampling number times per a predetermined sampling section. The calculation circuit is configured to calculate an average value of all the sampled sensor signals per the sampling section. The pulse width modulation conversion circuit is configured to generate a pulse width modulation signal having a pulse width corresponding to the average value. The output circuit is configured to output the pulse width modulation signal.

BRIEF DESCRIPTION OF THE DRAWINGS

The above and other objectives, features and advantages of the present invention will become more apparent from the following detailed description made with check to the accompanying drawings. In the drawings:

FIG. 2 is a flow diagram illustrating a process performed in the sensor circuit;

DETAILED DESCRIPTION OF THE PREFERRED EMBODIMENT

Figure 1:
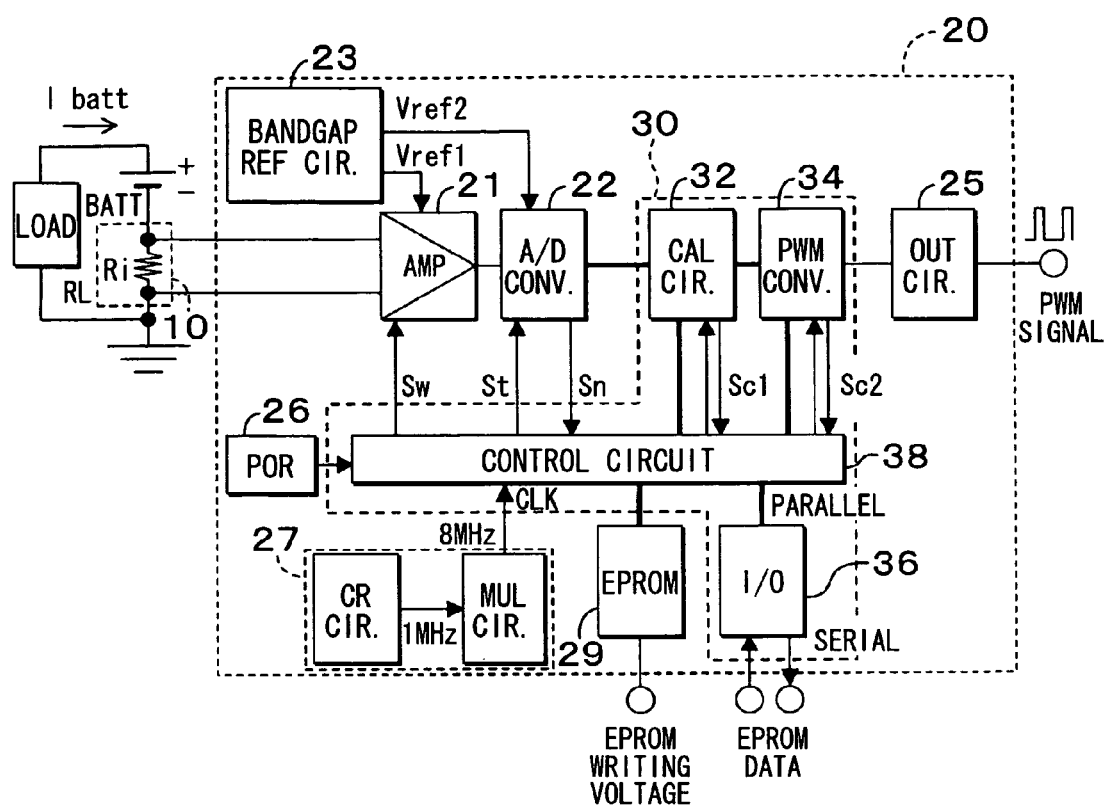
FIG. 1 is a block diagram illustrating a sensor circuit according to an embodiment of the present invention.

Referring to FIG. 1, a pulse width modulation (PWM) output type sensor circuit 20 according to an embodiment of the present invention includes an amplifier (AMP) 21, an analog-to-digital (A/D) converter 22, a constant voltage circuit 23, an output circuit 25, a power-on reset (POR) circuit 26, a clock generation circuit 27, an erasable programmable read only memory (EPROM) 29, and a digital signal processor (DSP) 30. The sensor circuit 20 is used to measure a battery current Ibatt of a vehicle battery BATT. The sensor circuit 20 produces a pulse-width modulation (PWM) signal having a pulse width associated with magnitude of the battery current Ibatt detected by a sensing element 10.

In the present embodiment, the battery current Ibatt flows through on-board electrical equipments (i.e., electrical loads) such as an engine starter motor, a power steering assist motor, a headlamp, and the like, and the sensing element 10 includes a resistor Ri coupled in series with the battery BATT. The battery current Ibatt can be detected by measuring a voltage drop across the resistor Ri.

The amplifier 21 of the sensor circuit 20 is a differential amplifier and amplifies (multiplies) the voltage drop across the resistor Ri by a predetermined gain. Thus, the amplifier 21 amplifies an electrical signal dependent on the battery current Ibatt by the predetermined gain. For example, when the battery current Ibatt of 800 amperes (A) flows through the resistor Ri of 0.1 milliohm (mΩ), the voltage drop of 80 millivolts (mV) appears across the resistor Ri. The voltage drop of 80 mV can be amplified to 1.6 volts (V) by setting the gain of the amplifier 21 to twenty. The amplifier 21 is supplied with a first reference voltage Vref1 from the constant voltage circuit 23.

The gain of the amplifier 21 can be selected from multiple setting values. For example, the gain of the amplifier 21 can be selected from a first gain A of 20 (twenty) and a second gain B of 120 (one hundred and twenty). The switching of the gain of the amplifier 21 can be archived by a gain switching signal received from a control circuit 38 of the DSP 30. If the magnitude of the battery current Ibatt is large enough to be processed by the A/D converter 22, the amplifier 21 can be eliminated from the sensor circuit 20.

The A/D converter 22 converts an analog voltage outputted from the amplifier 21 to 10-bit digital data. Thus, the battery current Ibatt is digitalized by the A/D converter 22. In the present embodiment, the A/D converter 22 is a successive approximation type. The A/D converter 22 starts an A/D conversion of the output voltage of the amplifier 21 upon receiving a sampling start signal St from the control circuit 38 of the DSP 30. In the A/D conversion, the output voltage of the amplifier 21 is sampled and held at given intervals. The sampled and held voltage is successively compared with a reference voltage outputted from an internal digital-to-analog (D/A) converter and converted to the digital data.

When the A/D conversion is completed, the A/D converter sends a sampling end signal Sn to the control circuit 38 of the DSP 30. Since the A/D converter 22 performs the A/D conversion synchronously with a reference clock signal CLK supplied from the clock generation circuit 27, the A/D converter 22 needs a predetermined A/D conversion time to complete the A/D conversion. The A/D converter 22 is supplied with a second reference voltage Vref2 from the constant voltage circuit 23. The A/D converter 22 can be a type other than a successive approximation type.

The constant voltage circuit 23 includes a bandgap reference circuit and generates and supplies the first and second reference voltages Vref1, Vref2 to the amplifier 21 and the A/D converter 22, respectively. The second reference voltage Vref2 is twice greater than the first reference voltage Vf1.

The output circuit 25 increases an effective drive capability of a PWM signal received from the DSP 30 and outputs the PWM signal having the increased drive capability.

The power-on-reset circuit 26 monitors a power supply voltage of the sensor circuit 20 and outputs an initialization trigger signal to the control circuit 38 of the DSP 30 immediately after the sensor circuit 20 is a powered on. The DSP 30 performs an initialization procedure in response to the trigger signal.

The clock generation circuit 27 has a time-base function and generates the reference clock signal CLK for the DSP 30. The clock generation circuit 27 includes a capacitor-resistor (CR) oscillator circuit having an oscillation frequency of 1 megahertz (MHz) and a multiplier circuit having a multiplication factor of 8 (eight). Thus, the clock generation circuit 27 generates the reference clock signal CLK of 8 MHz and supplies the reference clock signal CLK of 8 MHz to the control circuit 38 of the DSP 30.

The EPROM 29 is a semiconductor nonvolatile memory device and stores various data such as control data for the DSP 30, gain setting data for the amplifier 21, sampling setting data for the A/D converter 22, or the like. Data can be written to the EPROM 29 through a digital input/output (I/O) interface 36 of the DSP 30. The EPROM 29 can check consistency of the stored and written data. The EPROM 29 has a voltage input terminal for receiving a voltage that is used when data is written to the EPROM 29.

The DSP 30 processes the digital data received from the A/D converter 22. The DSP 30 includes a calculation circuit 32, a PWM converter 34, the digital I/O interface 36, and the control circuit 38.

The calculation circuit 32 evaluates the sum of the digital data inputted from the A/D converter 22 per each sampling section and calculates the average of the sum per each sampling section. The sampling section is determined by multiplying a sampling period by a sampling number. The A/D converter 22 samples the output voltage of the amplifier 21 at the sampling period. The number of times the A/D converter 22 samples the output voltage of the amplifier 21 is the sampling number. Further, the calculation circuit 32 performs an offset correction procedure, which is described later. The calculation circuit 32 transmits and receives a first control signal Sc1 to and from the control circuit 38 and operates in accordance with the first control signal Sc1.

Based on the average value calculated by the calculation circuit 32, the PWM converter 34 generates a PWM signal having a pulse width associated with the battery current Ibatt. The PWM converter 34 transmits and receives a second control signal Sc2 to and from the control circuit 38 and operates in accordance with the second control signal Sc2.

The digital I/O interface 36 has a serial-to-parallel conversion function that allows an external circuit (not shown) to write and read data to and from the EPROM 29 in serial data form. Further, the external circuit can transmit data and command signal (e.g., test command) to the DSP 30 through the digital I/O interface 36.

The control circuit 38 is a logic circuit. The control circuit 38 reads the control data from the EPROM 29 and controls signal processing performed in the DSP 30 in accordance with the control data. For example, the control circuit 38 determines the sampling number based on the digital data outputted from the A/D converter 22. Further, the control circuit 38 controls the averaging procedure, the integration procedure, and the offset procedure of the digital data and controls the PWM signal generation procedure. Furthermore, the control circuit 38 controls the gain switching procedure for the amplifier 21 and the sampling setting procedure for the A/D converter 22. The control circuit 38 operates synchronously with the reference clock signal CLK of 8 MHz supplied from the clock generation circuit 27.

The sensor circuit 20 performs a process illustrated by a flow diagram of FIG. 2. When the sensor circuit 20 is a powered on, the process proceeds to step S1, where the control circuit 38 performs the initialization procedure upon reception of the initialization trigger signal outputted from the power-on reset circuit 26. In the initialization procedure, each component of the DSP 30 is initialized.

Figure 3A:
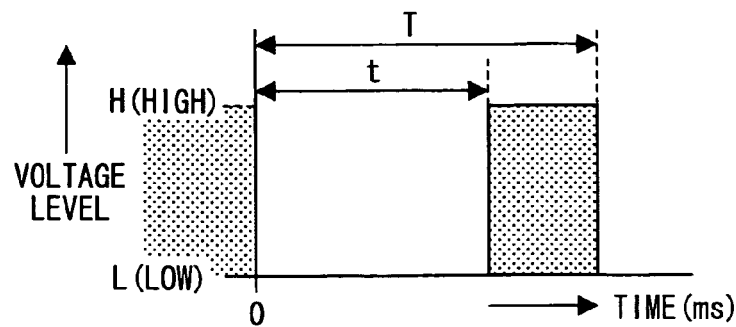
FIG. 3A is a graph illustrating a pulse width modulation signal having a duty ratio defined as a ratio of a low period of the pulse width modulation signal in one cycle of the pulse width modulation signal.
Figure 3B:
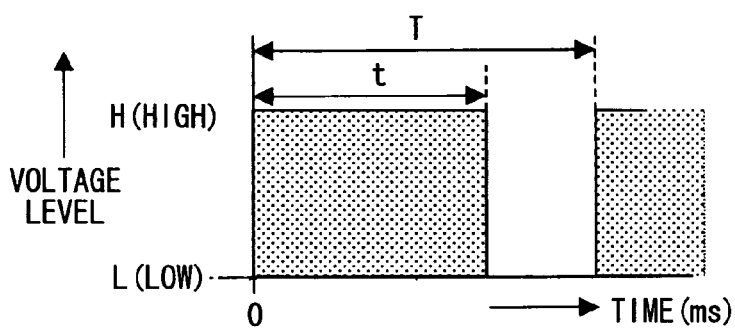
FIG. 3B is a graph illustrating a pulse width modulation signal having a duty ratio defined as a ratio of a high period of the pulse width modulation signal in one cycle of the pulse width modulation signal.

Then, the process proceeds to step S102, where the control circuit 38 performs an initial output setting procedure. In the initial output setting procedure, a logical setting of a PWM signal output of the PWM converter 34 is performed. For example, in FIG. 3A, the logical setting is performed so that the PWM signal is low at a starting point of a period T of the PWM signal and changes to high at a time t corresponding to a duty ratio of the PWM signal. Alternatively, as shown in FIG. 3B, the logical setting can be performed so that the PWM signal is high at the starting point of the period T of the PWM signal and changes to low at the time t corresponding to the duty ratio of the PWM signal. In the present embodiment, the logical setting is performed as shown in FIG. 3A.

Then, the process proceeds to step S103, where the control circuit 38 performs a data read procedure. In the data read procedure, the control circuit 38 reads gain setting data and zero point setting data for the amplifier 21, sampling setting data for the A/D converter 22 from the EPROM 29. For example, the gain setting data includes low gain data (e.g., corresponding to the gain A of twenty) and high gain data (e.g., corresponding to the high gain B of one hundred and twenty). For example, the sampling setting data includes low sampling number data (e.g., corresponding to a sampling number of two) corresponding to a low accuracy mode and high sampling number data (e.g., corresponding to a sampling number of eight) corresponding to a high accuracy mode.

Then, the process proceeds to step S104, where the control circuit 38 performs the gain setting procedure for the low accuracy mode. Specifically, the control circuit 38 sets the low gain data corresponding to the gain A of twenty to the amplifier 21.

Then, the process proceeds to step S105, where the control circuit 38 performs a stabilization procedure for the amplifier 21. In the stabilization procedure, the control circuit 38 causes the amplifier 21 to wait for a predetermined wait time necessary for the amplifier 21 to stably operate at the set gain value. For example, the amplifier 21 waits for 0.1 milliseconds. The wait time is measured by counting the reference clock pulse CLK of 8 MHz.

Then, the process proceeds to step S106, where the A/D conversion procedure and the integration procedure are performed.

Specifically, in the A/D conversion procedure, the low sampling number data corresponding to the sampling number of two is set to the A/D converter 22 so that the A/D converter 22 samples the output voltage of the amplifier 21 twice. Then, the sum of the two digital data is evaluated, and the average of the sum is calculated. Thus, the average of the two digital data is obtained.

The A/D converter 22 starts the A/D conversion upon receiving the sampling start signal St from the control circuit 38. When the A/D conversion of the first sampled voltage is completed, the A/D converter 22 outputs the first digital data to the calculation circuit 32. At the same time, the A/D converter 22 returns the sampling end signal Sn to the control circuit 38. The control circuit 38 outputs the sampling start signal St to the A/D converter 22 again upon receiving the sampling end signal Sn. The A/D converter 22 starts the A/D conversion again upon receiving the sampling start signal St from the control circuit 38. When the A/D conversion of the second sampled voltage is completed, the A/D converter 22 outputs the second digital data to the calculation circuit 32. The calculation circuit 33 evaluates the sum of the first and second digital data and calculates the average of the sum by dividing the sum by two. In practice, the sum is stored in a register, and one bit on the least significant bit (LSB) side of the resistor is removed. This means that the register shifts all the bits one position, moving from the most significant bit (MSB) toward LSB. In such an approach, the division of the sum by two can be easily achieved at high speed.

Figure 4:
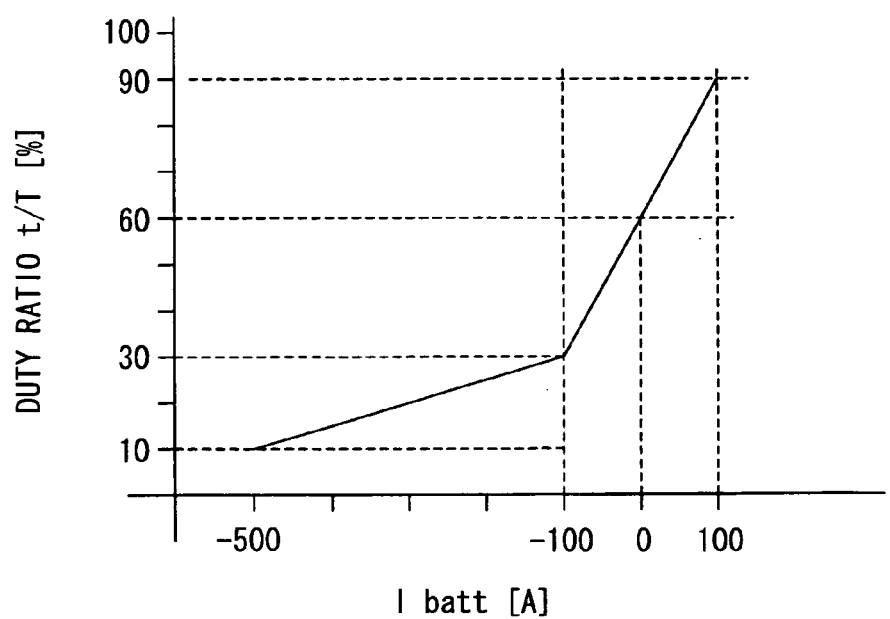
FIG. 4 is a graph illustrating a relationship between a detected electric current and a duty ratio of a pulse width modulation signal in the sensor circuit.

Then, the process proceeds to step S107, where the offset procedure for the average value is performed. As previously mentioned, the second reference voltage Vref2 is twice greater than the first reference voltage Vf1. Therefore, when the battery current Ibatt is zero amperes, the average value correspond to a duty ratio of 50%. However, in the present embodiment, when the battery current Ibatt is zero amperes, the average value corresponds to a duty ratio of 60%, as shown in FIG. 4. As a result, a deviation of 10% occurs. The offset procedure is applied to the average value calculated at step S106 so that the deviation of 10% can be corrected. Further, an error caused from an offset voltage of the amplifier 21 is corrected at step S107.

Then, the process proceeds to step S108, where the control circuit 38 performs a determination procedure for determining whether the mode switches from the low accuracy mode to the high accuracy mode. In short, at step S108, it is determined based on the average value corrected at S107 whether the output voltage of the amplifier 21 is sampled again in the high accuracy mode. When the corrected average value is in a predetermined range, it is determined that the mode switches to the high accuracy mode corresponding to YES at step S108, and the process proceeds to step S109. For example, in the case of FIG. 4, the predetermined range corresponds to a range from minus (−) 100 amperes to plus (+) 100 amperes of the battery current Ibatt. In contrast, when the corrected average value is outside the predetermined range, it is determined that the mode remains unchanged corresponding to NO at step S108, and the process jumps to step S113. For example, in the case of FIG. 4, when the corrected average value is less than −100 amperes, it is determined that the corrected average value is outside the predetermined range.

At step S109, the control circuit 38 performs the gain setting procedure for the high accuracy mode. Specifically, the control circuit 38 sets the high gain data corresponding to the gain B of one hundred and twenty to the amplifier 21.

Then, the process proceeds to step S110, where the control circuit 38 performs the stabilization procedure for the amplifier 21. In the stabilization procedure, the control circuit 38 causes the amplifier 21 to wait for a predetermined wait time necessary for the amplifier 21 to stably operate at the set gain value.

Then, the process proceeds to step S111, where the A/D conversion procedure and the integration procedure are performed. In the A/D conversion procedure, the high sampling number data corresponding to the sampling number of eight is set to the A/D converter 22 so that the A/D converter 22 samples the output voltage of the amplifier 21 eight times. Then, the sum of the eight digital data is evaluated, and the average of the sum is calculated. Thus, the average of the eight digital data is obtained.

The A/D converter 22 starts the A/D conversion upon receiving the sampling start signal St from the control circuit 38. When the A/D conversion of the first sampled voltage is completed, the A/D converter 22 outputs the first digital data to the calculation circuit 32. At the same time, the A/D converter 22 returns the sampling end signal Sn to the control circuit 38. The control circuit 38 outputs the sampling start signal St to the A/D converter 22 again upon receiving the sampling end signal Sn. This procedure is repeated eight times so that the calculation circuit 32 can obtain the sum of the eight digital data. The calculation circuit 32 calculates the average of the sum by dividing the sum by eight (i.e., two to the third power). In practice, the sum is stored in the register, and three bits on the least significant bit (LSB) side of the resistor is removed. This means that the register shifts all the bits three positions, moving from the most significant bit (MSB) toward LSB. In such an approach, the division of the sum by eight can be easily achieved at high speed.

Then, the process proceeds to step S112, where the offset procedure for the average value is performed. As previously mentioned, the second reference voltage Vref2 is twice greater than the first reference voltage Vf1. Therefore, when the battery current Ibatt is zero amperes, the average value correspond to a duty ratio of 50%. However, in the present embodiment, when the battery current Ibatt is zero amperes, the average value corresponds to a duty ratio of 60%, as shown in FIG. 4. As a result, a deviation of 10% occurs. The offset procedure is applied to the average value calculated at step S111 so that the deviation of 10% can be corrected. Further, the error caused from the offset voltage of the amplifier 21 is corrected at step S112.

Then, the process proceeds to step S113, where an output timing of the PWM signal is determined based on the corrected average value. For example, in the case of FIG. 4, when the corrected average value is in a range from −500 A to −100 A, a reverse timing of the PWM signal is set so that the duty ratio (t/T) of the PWM signal is in a range from 10% to 30%. When the corrected average value is in a range from −100 A to +100 A, the reverse timing of the PWM signal is set so that the duty ratio (t/T) of the PWM signal is in a range from 30% to 90%.

As shown in FIG. 3A, the duty ratio (t/T) is defined as the ratio of the low period (t) of the PWM signal in one cycle (T) of the PWM signal. Alternatively, as shown in FIG. 3B, the duty ratio (t/T) can be defined as the ratio of the high period (t) of the PWM signal in one cycle (T) of the PWM signal.

Figure 5:
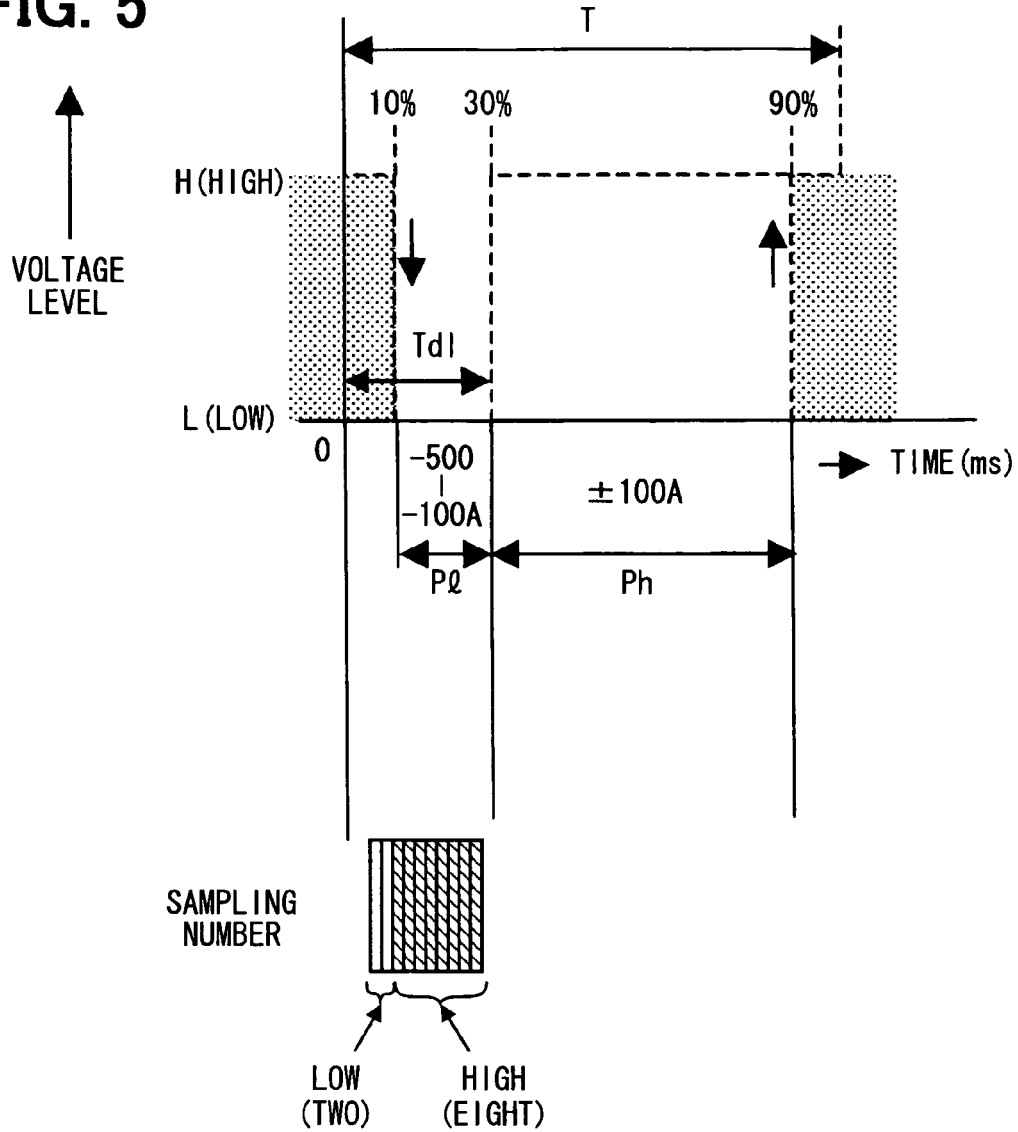
FIG. 5 is a graph illustrating a relationship between a sampling number and a pulse width modulation signal in the sensor circuit.

In FIG. 5, Tdl represents a time corresponding to a duty ratio of 30%. To enable the output voltage of the amplifier 21 to be sampled again in the high accuracy mode and to enable a PWM signal having a duty ratio corresponding to the high accuracy mode to be outputted in a time period Ph, the time Tdl should satisfy the following inequality:

$$Tdl > Ts + Tcon \cdot (Nsl + Nsh) + Te$$

In the above inequality, Ts represents a time required to finish pre-processing of the sampling in the low accuracy mode, Te represents a time required to finish post-processing of the sampling in the high accuracy mode, Nsl represents the sampling number in the low accuracy mode, Nsh represents the sampling number in the high accuracy mode, and Tcon represents a time required to convert each sampled voltage to the PWM signal. In the present embodiment, as shown in FIG. 5, when it is determined that the output voltage of the amplifier 21 to be sampled again in the high accuracy mode (at step S108), the sampling in the high accuracy mode is performed to overlap a time period Pl assigned to a PWM signal having a duty ratio corresponding to the low accuracy mode. In such an approach, the sampling number in the high accuracy mode can be increased so that the battery signal Ibatt can be accurately detected.

Then, the process proceeds to step S114, where a waiting procedure is performed to wait until the arrival of the reversing timing, which is set at step S113. If the reversing timing arrives corresponding to YES at step S114, the process proceeds to step S115, where the PWM signal is changed from low to high. Then, the process proceeds to step S116, where it is determined whether time corresponding to one cycle (T) has been elapsed. If the time corresponding to one cycle (T) has been elapsed corresponding to YES as step S116, the process returns to step S104.

Thus, as shown in FIGS. 4, 5, when the battery current Ibatt needs to be detected with high accuracy (e.g., in the range from −100 A to +100 A of FIG. 4), the sampling number is increased (e.g., eight) so that the output voltage of the amplifier 21 is sampled many times (i.e., at short intervals). When the battery current Ibatt does not need to be detected with high accuracy (e.g., in the range from −500 A to −100 A of FIG. 4), the sampling number is reduced (e.g., two) so that the output voltage of the amplifier 21 is sampled a few times (i.e., at long intervals). In such an approach, the battery current Ibatt can be accurately detected over a wide range of −500 A to +100 A.

Further, as shown in FIG. 4, the battery current Ibatt can be detected at two resolutions according to the magnitude of the battery current Ibatt.

According to the present embodiment, the control circuit 38 determines whether to change the sampling mode from the low accuracy mode to the high accuracy mode, based on the average value of the two data sampled in the low accuracy mode by the A/D converter 22. Therefore, since there is no need that the control circuit 38 has a sampling circuit, structure of the sensor circuit 20 can be simplified. Alternatively, the control circuit 38 may has a sampling circuit such an A/D converter.

The amplifier 21 is used upstream from the A/D converter 22 to amplify the electric signal indicative of the battery current Ibatt. When the A/D converter 22 samples the output voltage of the amplifier 21 in the low accuracy mode, the amplifier 21 is set to the low gain A (e.g., twenty). In contrast, when the A/D converter 22 samples the output voltage of the amplifier 21 in the high accuracy mode, the amplifier 21 is set to the high gain B (e.g., one hundred and twenty). Thus, the gain of the amplifier 21 is set according to the sampling number times the A/D converter 22 samples the output voltage of the amplifier 21. In such an approach, the battery current Ibatt can be more accurately detected over the wide range.

Since the sampling number is a power of two times, the division of the sum can be achieved by shifting bits from the most significant bit (MSB) toward the least significant bit (LSB). Therefore, the division of the value can be achieved by a simple hardware logic circuit. Thus, the calculation circuit 32 can easily calculate the average of the sum at high speed.

The control circuit 38 causes the A/D converter 22 to switch to the high accuracy mode, when the average value is in the range from −100 A to +100 A. In other words, the control circuit 38 causes the A/D converter 22 to switch to the high accuracy mode, when the battery current Ibatt is in a predominated range in which a value of zero as a reference exists. In such an approach, if the sensor circuit 20 outputs the PWM signal to an apparatus that performs a first control operation when the battery current Ibatt is minus and performs a second control operation different from the first control operation when the battery current is plus, the apparatus can accurately perform the control operations based on the PWM signal outputted from the sensor circuit 20.

(Modifications)

Figure 6:
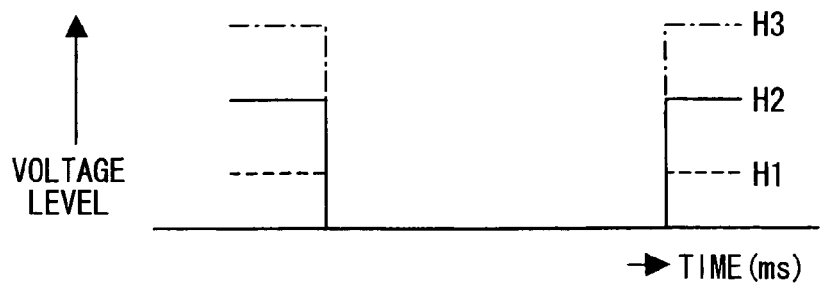
FIG. 6 is a graph illustrating a relationship between a temperature and a pulse height of a pulse width modulation signal in the sensor circuit.

The embodiments described above may be modified in various ways. For example, the output circuit 25 can superimpose additional information on the PWM signal by changing a pulse height of the PWM signal. As shown in FIG. 6, the output circuit 25 may change the pulse height of the PWM signal based on a temperature of the battery BATT. In the case of FIG. 6, when the temperature detected by a temperature sensor (not shown) is in a range from −30 degrees Celsius (° C.) to 0° C., the pulse height of the PWM signal is set to a height H1. When the temperature is in a range from 0° C. to +70° C., the pulse height of the PWM signal is set to a height H2. When the temperature is in a range from +70° C. to +90° C., the pulse height of the PWM signal is set to a height H3.

The gain of the amplifier 21 and the sampling number of the A/D converter 22 can be selected from three or more setting values. The sensor circuit 20 can detect a physical quantity other than the battery current Ibatt. For example, the sensor circuit 20 may detect light, temperature, pressure, or the like. The sampling number in the low accuracy mode can be other than two, and the sampling number in the high accuracy mode can be other than eight. For example, the sampling number in the low accuracy mode may be set to ten, and the sampling number in the high accuracy mode may be set to one hundred.

Such changes and modifications are to be understood as being within the scope of the present invention as defined by the appended claims.

What is claimed is:

1. A PWM output type sensor circuit for outputting a PWM output having a pulse width associated with a first physical quantity as information about the first physical quantity, the PWM output type sensor circuit comprising:
   physical quantity obtaining means for outputting sensor data by obtaining the information about the first physical quantity detected by a sensor element;
   sampling means for sampling the sensor data outputted from the physical quantity obtaining means a plurality of times;
   calculation means for calculating an average value of the sum of sensor data sampled by the sampling means per sampling time;
   sampling number determination means for determining a sampling number to be set for the sampling means based on the sensor data outputted from the physical quantity obtaining means, the plurality of sensor data sampled by the sampling means, or the average value calculated by the calculation means;
   PWM conversion means for generating the PWM output having the pulse width associated with the first physical quantity based on the average value calculated by the calculation means; and
   output means for outputting the PWM output generated by the PWM conversion means.

2. The PWM output type sensor circuit according to claim 1, wherein
   the sampling means has at least a low accuracy mode and a high accuracy mode,
   in the low accuracy mode, the sampling means samples the sensor data a predetermined number of times,
   in the high accuracy mode, the sampling means samples the sensor data a number of times greater than the predetermined number of times, and
   the sampling number determination means determines the sampling number based on the average value that is calculated by the calculation means by summing the plurality of sensor data that are sampled by the sampling means in the low accuracy mode.

3. The PWM output type sensor circuit according to claim 2, further comprising:
   amplifier means disposed upstream from the physical quantity obtaining means and for amplifying an electrical signal corresponding to the first physical quantity by a predetermined gain, wherein
   the predetermined gain of the amplifier means is lower when the sampling means samples the sensor data in the low accuracy mode than when the sampling means samples the sensor data in the high accuracy mode, and
   the predetermined gain of the amplifier means is higher when the sampling means samples the sensor data in the high accuracy mode than when the sampling means samples the sensor data in the low accuracy mode.

4. The PWM output type sensor circuit according to claim 1, wherein
   the sampling number by which the sampling means samples the sensor data is a power of two.

5. The PWM output type sensor circuit according to claim 2, wherein
   the PWM output is outputted to an apparatus or a system that is configured to perform a control operation that is different between when the first physical quantity has a positive value with respect to a predetermined value and when the first physical quantity has an negative value with respect to the predetermined value, and
   when the sensor data outputted from the physical quantity obtaining means is in a range from the negative value to the positive value including the predetermined value, the sampling number determination means determines the sampling number corresponding to the high accuracy mode.

6. The PWM output type sensor circuit according to claim 1, wherein,
   the output means associates a pulse height of the PWM output with a second physical quantity different from the first physical quantity.

7. The PWM output type sensor circuit according to claim 2, wherein
   when the sampling number determination circuit determines the sampling number corresponding to the high accuracy mode, the sampling in the high accuracy mode is performed by overlapping a time period where the output in the low accuracy mode is generated.

* * * * *